(12) United States Patent
Harter

(10) Patent No.: US 11,518,326 B2
(45) Date of Patent: Dec. 6, 2022

(54) BUMPER ASSEMBLY

(71) Applicant: Dr. Ing. h.c. F. Porsche Aktiengesellschaft, Stuttgart (DE)

(72) Inventor: Sebastian Harter, Weissach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 7 days.

(21) Appl. No.: 17/179,457

(22) Filed: Feb. 19, 2021

(65) Prior Publication Data
US 2021/0268977 A1 Sep. 2, 2021

(30) Foreign Application Priority Data
Mar. 2, 2020 (DE) ................ 10 2020 105 428.9

(51) Int. Cl.
*B60R 19/38* (2006.01)
*B60R 19/04* (2006.01)
(52) U.S. Cl.
CPC ............. *B60R 19/38* (2013.01); *B60R 19/04* (2013.01)
(58) Field of Classification Search
CPC ......... B60R 19/04; B60R 19/12; B60R 19/38; B60R 19/40; B60R 2019/245
USPC ........ 293/118, 120, 155; 296/187.09, 193.09
See application file for complete search history.

(56) References Cited

U.S. PATENT DOCUMENTS

| 7,533,912 | B2 * | 5/2009 | Frederick | B60R 19/18 293/142 |
|---|---|---|---|---|
| 7,993,725 | B2 * | 8/2011 | Rossi | B60R 19/18 24/442 |
| 8,408,613 | B1 * | 4/2013 | Tanton | B60R 19/18 293/109 |
| 10,220,804 | B2 * | 3/2019 | Sedique | B60Q 1/20 |
| 2008/0014016 | A1 * | 1/2008 | Keller | B60R 19/24 403/326 |
| 2015/0298632 | A1 * | 10/2015 | Chiba | B60R 19/24 29/525.01 |

FOREIGN PATENT DOCUMENTS

| DE | 102010055953 A1 | 6/2012 |
|---|---|---|
| DE | 102015118087 A1 | 4/2017 |
| FR | 2921878 A1 | 4/2009 |
| JP | 2006088735 A | 4/2006 |

* cited by examiner

*Primary Examiner* — D Glenn Dayoan
*Assistant Examiner* — Veronica M Shull
(74) *Attorney, Agent, or Firm* — Leydig, Voit & Mayer, Ltd.

(57) ABSTRACT

A bumper assembly of a motor vehicle includes a cross-member which extends in the motor vehicle transverse direction and a front section which is arranged in front of the cross-member in the motor vehicle longitudinal direction. The front section is supported on the cross-member in the motor vehicle vertical direction via a support element. The support element is produced in one piece with the front section and is pivotable between a production position and a mounted position.

15 Claims, 4 Drawing Sheets

BUMPER ASSEMBLY

CROSS-REFERENCE TO PRIOR APPLICATIONS

Priority is claimed to German Patent Application No. DE 10 2020 105 428.9, filed on Mar. 2, 2020, the entire disclosure of which is hereby incorporated by reference herein.

FIELD

The present disclosure relates to a bumper assembly of a motor vehicle, having a cross-member which extends in the motor vehicle transverse direction and a front section which is arranged in front of the cross-member in the motor vehicle longitudinal direction, in which the front section is supported on the cross-member in the motor vehicle vertical direction via a support element.

BACKGROUND

Bumper assemblies for the front region of a motor vehicle are well known from the prior art. The bumper assemblies conventionally comprise a front section, which is a cladding element and forms a portion of the outer skin of the motor vehicle. The form of the front section has a major influence on the aerodynamics of the motor vehicle, wherein, in particular in the case of sports vehicles, the aerodynamics of the motor vehicle are influenced, by a specific form of the front section, in such a manner that an increased downforce is established at the front axle of the motor vehicle. Relatively high aerodynamic forces thereby act in the vehicle vertical direction on the portions of the front section that generate the downforce. These aerodynamic forces can lead to the front section deforming, whereby the front section could be damaged and/or the aerodynamics of the motor vehicle could be impaired. In order to prevent this, the highly loaded portions of the front section are connected to a cross-member of the motor vehicle, so that the front section is supported on the cross-member at least in the vehicle vertical direction. For supporting the front section on the cross-member, an additional support element is provided, which is arranged between the front section and the cross-member and transmits the aerodynamic force acting on the front section to the cross-member and, as a result, to the body structure of the motor vehicle. Such a bumper assembly is disclosed, for example, in DE 10 2015 118 087 A1.

A disadvantage of such a form of the bumper assembly is that the outlay in terms of production is relatively high, wherein each individual part is produced in a separate production process. Furthermore, mounting of the support element is complex, wherein the support element must be positioned and aligned manually and in a complex operation by a workman before it can be fastened to the front section.

SUMMARY

In an embodiment, the present invention provides a bumper assembly of a motor vehicle. The bumper assembly includes a cross-member which extends in the motor vehicle transverse direction, and a front section which is arranged in front of the cross-member in the motor vehicle longitudinal direction. The front section is supported on the cross-member in the motor vehicle vertical direction via a support element. The support element is produced in one piece with the front section and is pivotable between a production position and a mounted position.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
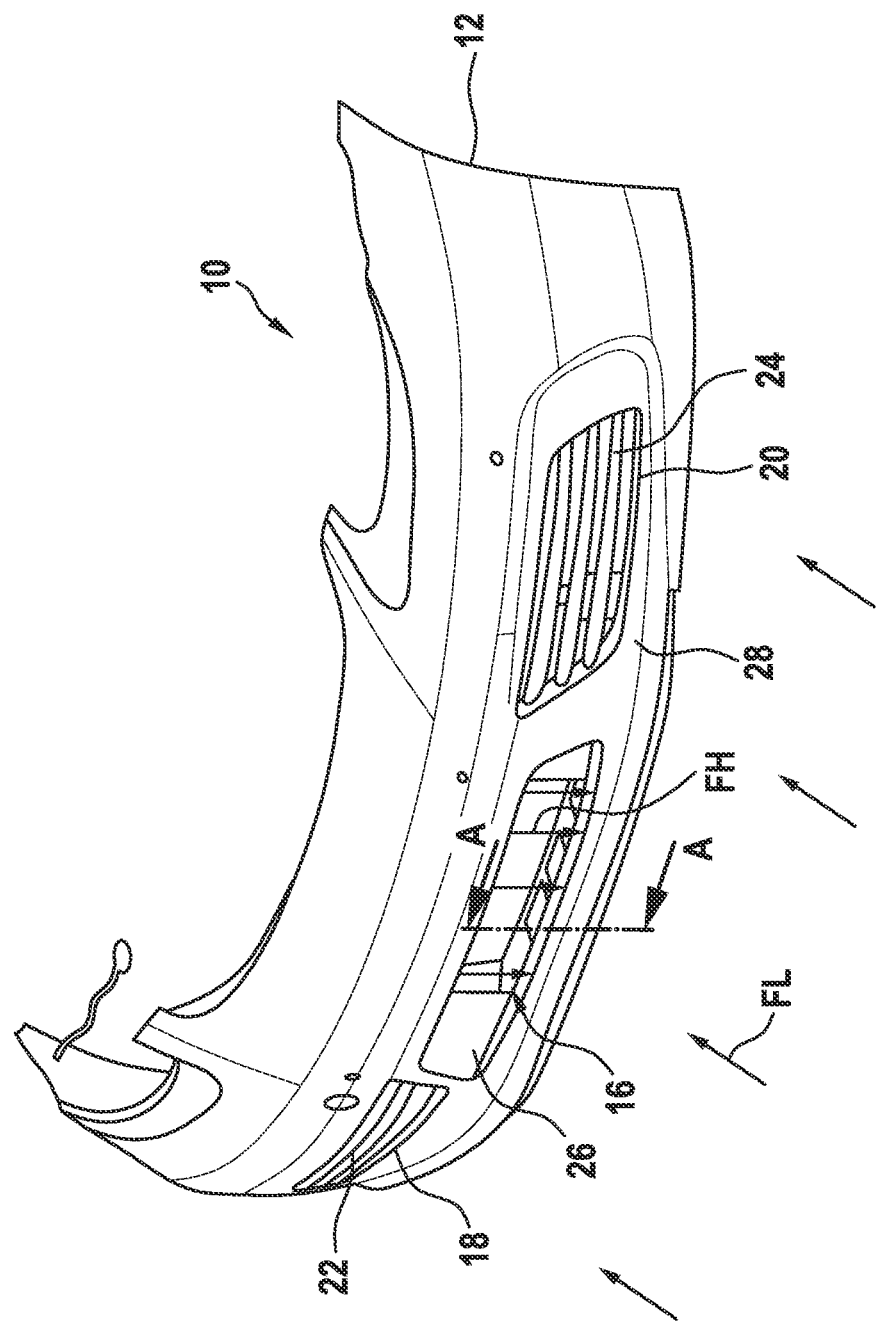
FIG. 1 shows a front section of a bumper assembly in a perspective view.

The present disclosure provides a bumper assembly for a front section of a motor vehicle which has a reduced outlay in terms of production and mounting.

As a result of the fact that the support element is produced in one piece with the front section and is adjustable between a production position or a mounted position, the outlay in terms of production and the outlay in terms of mounting of the bumper assembly can be reduced, wherein the support element is produced concomitantly during the production of the front section, in particular by an injection molding process, so that a separate production step or new production process for producing the support element is not required. After the front section and the support element have been produced in a common production process, the support element is arranged in the production position. In a step following the production process, the support element is adjusted into the mounted position, wherein the mounted position is already specified by the one-piece form of the support element with the front section and complex, expert alignment and positioning of the support element is not required. In addition, incorrect mounting of the support element is prevented, since the support element can be adjusted only between the two positions. Finally, the front section is mounted on the motor vehicle, wherein in the final mounted state of the front section, the support element lies on the cross-member and as a result the front section is supported on the cross-member.

Preferably, a film hinge is provided in a connecting portion between the support element and the front section. Alternatively, a predetermined breaking point is provided in the connecting portion between the support element and the front section. As a result, the support element produced in one piece with the front section can be adjusted, or pivoted, in a simple manner from the production position into the mounted position. In addition, mounting of the bumper assembly is facilitated in that the support element is already arranged at the position to be mounted and must simply be pivoted into the mounted position required for final mounting.

Preferably, the support element is screwed to the front section in the mounted position. As a result, the support element is fixed in the mounted position and undesirable adjustment of the support element relative to the cross-member and relative to the front section is prevented.

Preferably, the support element is fastened to the front section in the mounted position by latching, whereby the support element can be fixed easily and quickly to the front section. As a result, the outlay in terms of mounting of the bumper assembly is reduced, wherein no additional mounting steps by the workman are required for fixing the support element in the mounted position and no additional mounting tool is required.

In a preferred embodiment, the cross-member is curved in the vehicle longitudinal direction, wherein the support element has at least two support members which are arranged next to one another in the vehicle transverse direction. In order to ensure that the front section is supported on a curved cross-member over the entire width of the motor vehicle, that is to say over the entire extent of the front section in the motor vehicle transverse direction, the support element is divided into a plurality of support members, preferably into four support members, wherein the support members are arranged at an angle relative to one another and are arranged next to one another following the curved cross-member.

Preferably, the front section has a separate air inlet element, wherein the support element is produced in one piece with the air inlet element. The front section has a plurality of air inlets, in particular a middle air inlet, which ensure a stream of air to a cooler. The middle air inlet is delimited by the air inlet element, which is a separate component and is inserted into the middle air inlet. The support element is molded onto the air inlet element, whereby the outlay in terms of production of the bumper assembly is simplified.

In a preferred embodiment, the front section is supported on the cross-member in the vehicle longitudinal direction and in the vehicle vertical direction via the support element. Preferably, the support element has an L-shaped cross-section, wherein a first leg lies on the cross-member in the motor vehicle longitudinal direction and a second leg lies on the cross-member in the motor vehicle vertical direction. While the motor vehicle is moving, the front section is loaded on the one hand by an aerodynamic force acting in the motor vehicle longitudinal direction and on the other hand by an aerodynamic force acting in the motor vehicle vertical direction. By means of such a form of the support element, the front section can be supported on the cross-member both in the motor vehicle longitudinal direction and in the motor vehicle vertical direction, whereby deformation or displacement of the front section as a result of the aerodynamic forces acting thereon in the motor vehicle longitudinal direction and in the motor vehicle vertical direction can be reduced.

There is accordingly produced a bumper assembly which ensures that the front section is reliably supported on the cross-member and which has a reduced outlay in terms of production and mounting.

Figure 2:
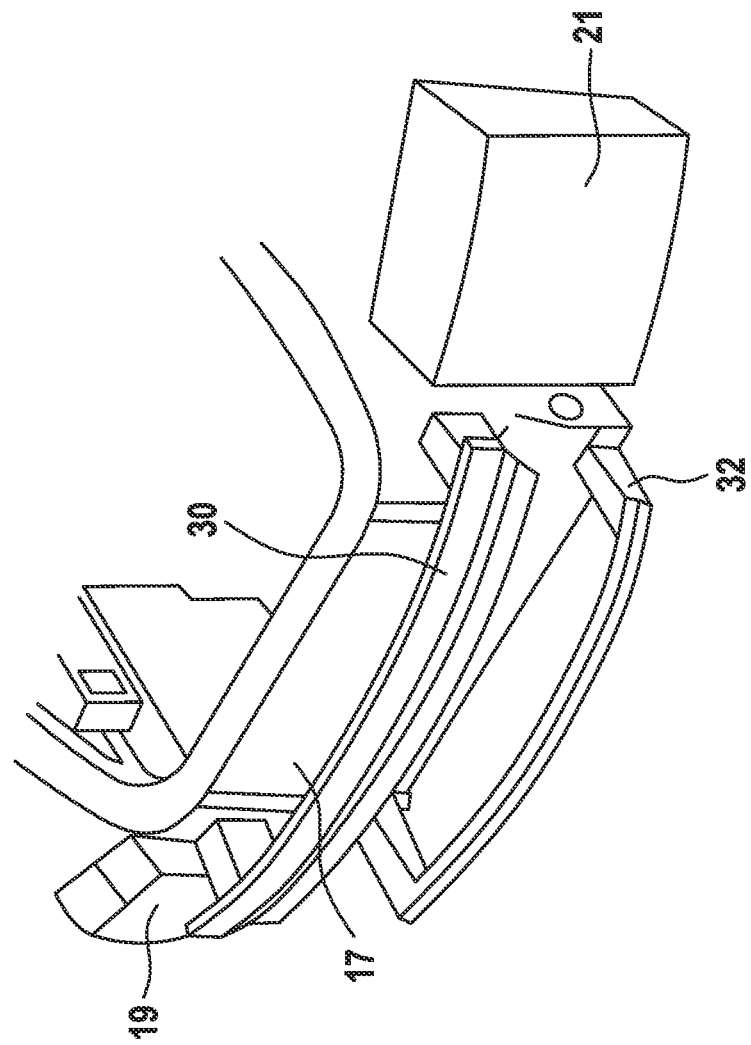
FIG. 2 shows a cross-member of the bumper assembly in a perspective view.

FIG. 1 and FIG. 2 show a bumper assembly 10. FIG. 1 shows a front section 12 of the bumper assembly 10. The front section 12 serves as a cladding element in the front region of a motor vehicle. The front section 12 has in the upper region a contour which is determined by the components adjoining the front section 12, wherein the front section 12 adjoins a headlamp, not shown in FIG. 1, in each of the outer regions as seen in the vehicle transverse direction and adjoins an engine hood, likewise not shown in FIG. 1, in the middle region as seen in the vehicle transverse direction. In the lower region of the front section 12 there are provided a middle air inlet opening 16 and two outer air inlet openings 18, 20, wherein in each case a stream of air flows through the respective air inlet opening 16, 18, 20 to a corresponding cooler 17, 19, 21, shown in FIG. 2, and is used as cooling air. In each of the outer air outlet openings 18, 20 there is arranged a fin device 22, 24, which can be adjustable. In the middle air inlet opening 16 there is arranged an air inlet element 26 which defines the inflow cross-section of the air inlet opening 16. At the end of the front section 12 facing the roadway there is provided a spoiler 28. The front section 12 shown in FIG. 1 covers inter alia an upper cross-member 30 and a lower cross-member 32, which are shown in FIG. 2.

While the motor vehicle is moving, air flows around the motor vehicle and thus around the front section 12, wherein the air loads the front section 12 with an aerodynamic force FL acting in the motor vehicle longitudinal direction and with an aerodynamic force FH acting in the motor vehicle vertical direction, wherein in particular the spoiler 28 is loaded by the aerodynamic force FH acting in the motor vehicle vertical direction.

The aerodynamic force FH acting on the spoiler 28 in the motor vehicle vertical direction can have the result that the front section 12 and in particular the spoiler 28 deforms and is thereby damaged and the aerodynamics of the motor vehicle are adversely affected. The front section 12 is therefore supported in the region of the spoiler 28 on the lower cross-member 32 in the motor vehicle vertical direction, wherein there is arranged between the front section 12 and the lower cross-member 32 a support element 40 via which the front section 12 is supported on the cross-member 32 in the motor vehicle vertical direction.

Figure 3A:
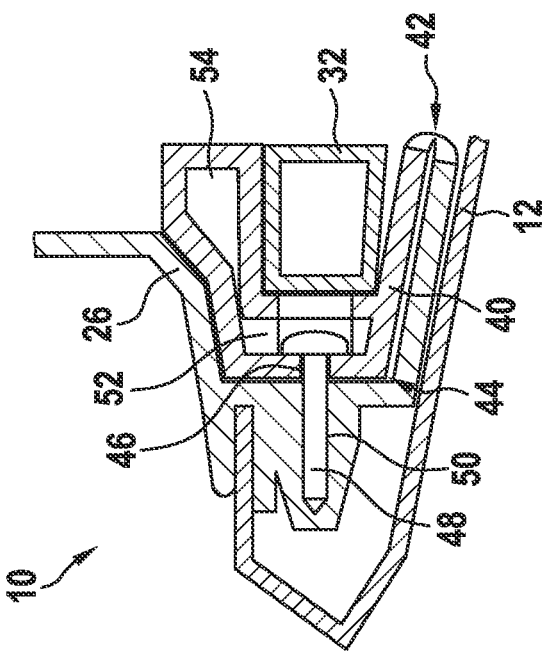
FIG. 3a shows, in cross-section, the front section of FIG. 1 and a first embodiment of a support element in the production position.
Figure 3B:
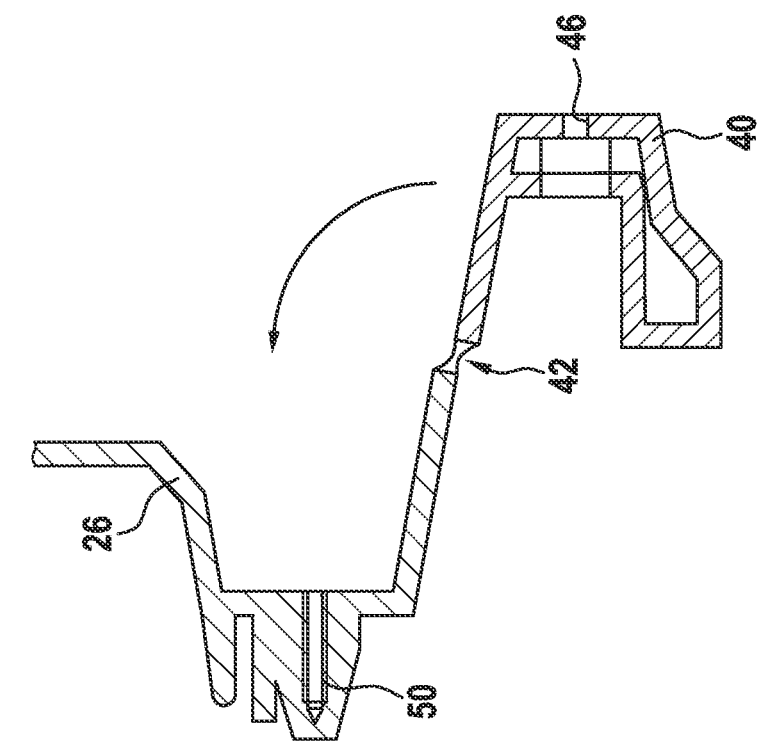
FIG. 3b shows, in cross-section, the front section of FIG. 1, the cross-member of FIG. 2 and the first embodiment of the support element in the mounted position.

FIGS. 3a, 3b, 4 and 5 show such a support element 40. According to the present disclosure, the support element 40 is produced in one piece with the air inlet element 26 of the front section 12 and is adjustable between a production position and a mounted position. FIG. 3a shows the support element 40 in the production position. In a connecting portion between the air inlet element 26 and the support element 40 there is provided a film hinge 42, which has a reduced wall thickness compared to the support element 40 and the air inlet element 26 and as a result is resiliently deformable. FIG. 3b shows the support element 40 in the mounted position. The support element 40 is fixed to the air inlet element 26 in the mounted position via a screw 48, wherein the support element 40 has a through-opening 46 through which the screw shaft of the screw 48 is inserted and screwed into a threaded bore 50 provided in the air inlet element 26.

The support element 40 has an L-shaped cross-section, wherein a first leg 52 lies on the lower cross-member 32 in the motor vehicle longitudinal direction and a second leg 54 lies on the cross-member 32 in the motor vehicle vertical direction.

Figure 4:
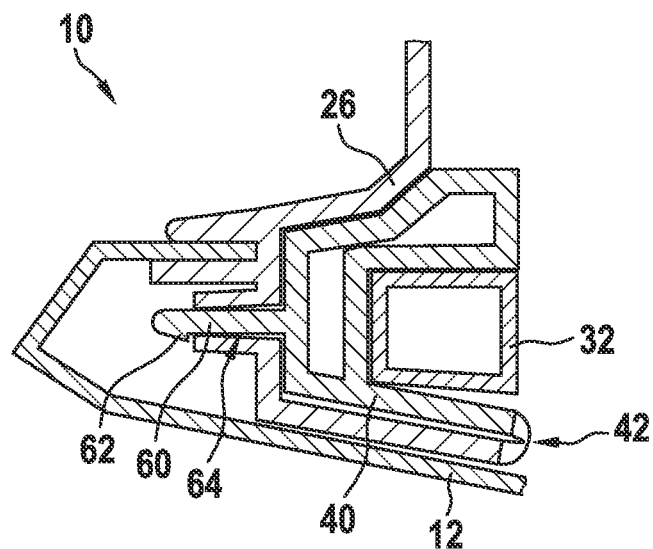
FIG. 4 shows, in cross-section, the front section of FIG. 1, the cross-member of FIG. 2 and a second embodiment of the support element in the production position.

FIG. 4 shows a second embodiment of the support element 40, wherein the only difference with respect to the first embodiment of FIG. 3 is the final fixing of the support element 40 to the air inlet element 26. The support element 40 is fastened to the air inlet element 26 by latching. For this purpose, a projection 60 having a latching lug 62 is provided on the support element 40, and an opening 64 is provided in the air inlet element 26. In the mounted position, the projection 60 engages into the opening 64 and the latching lug 62 engages behind the air inlet element 26. As a result, the support element 40 is finally fixed in the mounted position.

Figure 5:
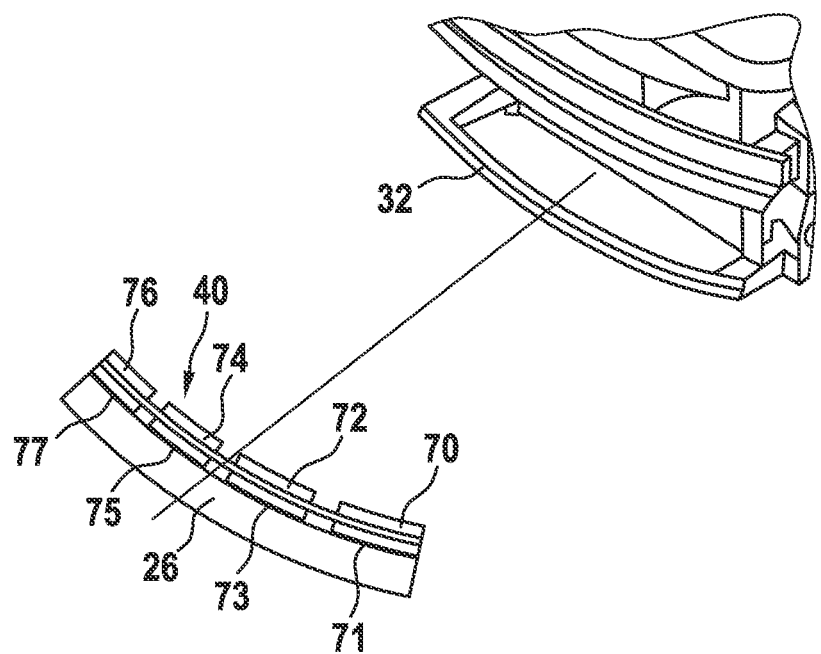
FIG. 5 shows, schematically, the front section of FIG. 1, the cross-member of FIG. 2 and a third embodiment of the support element.

FIG. 5 shows a third embodiment of the support element 40. The lower cross-member 32 is thereby curved in the motor vehicle longitudinal direction. In order to be able to follow this curved shape of the lower cross-member 32 and allow the front section 12 to be supported on the lower cross-member 32, the support element is divided into four support members 70, 72, 74, 76. The support members 70, 72, 74, 76 are arranged next to one another in the motor vehicle transverse direction and are produced in one piece with the air inlet element 26. In the connecting portion between the support members 70, 72, 74, 76 and the air inlet element 26 there is provided in each case a film hinge 71, 73, 75, 77, so that the support members 70, 72, 74, 76 can be adjusted between the production position and the mounted position.

There is thereby produced a bumper assembly 10 which ensures that the front section is reliably supported on the cross-member 32 and which has a reduced outlay in terms of production and mounting.

Structural embodiments different from the described embodiments are also possible, which fall within the scope of protection of the main claim.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A bumper assembly of a motor vehicle, comprising:
   a cross-member which extends in the motor vehicle transverse direction, and
   a front section which is arranged in front of the cross-member in the motor vehicle longitudinal direction, the front section being supported on the cross-member in the motor vehicle vertical direction via a support element,
   wherein the support element is produced in one piece with the front section, is pivotable between a production position and a mounted position, and is either screwed to the front section in the mounted position or fastened to the front section in the mounted position by latching.

2. The bumper assembly as claimed in claim 1, further comprising a film hinge provided in a connecting portion between the support element and the front section.

3. The bumper assembly as claimed in claim 1, further comprising a predetermined breaking point in a connecting portion between the support element and the front section.

4. The bumper assembly as claimed in claim 1, wherein the cross-member is curved in the vehicle longitudinal direction, and wherein the support element has at least two support members arranged next to one another in the motor vehicle transverse direction.

5. The bumper assembly as claimed in claim 1, wherein the front section has a separate air inlet element, and wherein the support element is produced in one piece with the air inlet element.

6. The bumper assembly as claimed in claim 1, wherein the front section is supported on the cross-member in the motor vehicle vertical direction and in the motor vehicle longitudinal direction via the support element.

7. The bumper assembly as claimed in claim 6, wherein the support element has an L-shaped cross-section, wherein a first leg lies on the cross-member in the motor vehicle longitudinal direction and a second leg lies on the cross-member in the motor vehicle vertical direction.

8. A bumper assembly of a motor vehicle, comprising:
   a cross-member which extends in the motor vehicle transverse direction, and
   a front section which is arranged in front of the cross-member in the motor vehicle longitudinal direction, the front section being supported on the cross-member in the motor vehicle vertical direction via a support element,
   wherein the front section has a separate air inlet element, and the support element is produced in one piece with the air inlet element and the front section and is pivotable between a production position and a mounted position.

9. The bumper assembly as claimed in claim 8, further comprising a film hinge provided in a connecting portion between the support element and the front section.

10. The bumper assembly as claimed in claim 8, further comprising a predetermined breaking point in a connecting portion between the support element and the front section.

11. The bumper assembly as claimed in claim 8, wherein the support element is screwed to the front section in the mounted position.

12. The bumper assembly as claimed in claim 8, wherein the support element is fastened to the front section in the mounted position by latching.

13. The bumper assembly as claimed in claim 8, wherein the cross-member is curved in the vehicle longitudinal direction, and wherein the support element has at least two support members arranged next to one another in the motor vehicle transverse direction.

14. The bumper assembly as claimed in claim 8, wherein the front section is supported on the cross-member in the motor vehicle vertical direction and in the motor vehicle longitudinal direction via the support element.

15. The bumper assembly as claimed in claim 14, wherein the support element has an L-shaped cross-section, wherein a first leg lies on the cross-member in the motor vehicle longitudinal direction and a second leg lies on the cross-member in the motor vehicle vertical direction.

* * * * *